United States Patent
Sevcenko et al.

(10) Patent No.: US 11,514,162 B1
(45) Date of Patent: Nov. 29, 2022

(54) SYSTEM AND METHOD FOR DIFFERENTIAL MALWARE SCANNER

(71) Applicant: UAB 360 IT, Vilnius (LT)

(72) Inventors: Aleksandr Sevcenko, Vilnius (LT); Mantas Briliauskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/575,033

(22) Filed: Jan. 13, 2022

(51) Int. Cl.
*G06F 21/56* (2013.01)

(52) U.S. Cl.
CPC .......... *G06F 21/565* (2013.01); *G06F 21/566* (2013.01); *G06F 2221/033* (2013.01)

(58) Field of Classification Search
CPC ....... G06F 21/565; G06F 21/56; G06F 21/566
See application file for complete search history.

(56) References Cited

U.S. PATENT DOCUMENTS

| | | | |
|---|---|---|---|
| 9,705,904 B1* | 7/2017 | Davis | H04L 63/1408 |
| 2012/0240230 A1* | 9/2012 | Lee | G06F 21/564 |
| | | | 726/24 |
| 2016/0285900 A1* | 9/2016 | Seinfeld | H04L 63/1416 |
| 2017/0193230 A1* | 7/2017 | Jevnisek | G06F 21/564 |
| 2018/0013772 A1* | 1/2018 | Schmidtler | H04L 63/1425 |
| 2019/0108338 A1* | 4/2019 | Saxe | G06F 21/562 |
| 2020/0257799 A1* | 8/2020 | Saxe | G06F 21/563 |
| 2020/0358799 A1* | 11/2020 | Boyer | H04L 51/224 |
| 2021/0120016 A1* | 4/2021 | Sotirov | H04L 63/1416 |
| 2022/0050899 A1* | 2/2022 | Tormasov | G06F 11/1451 |

* cited by examiner

*Primary Examiner* — Jayesh M Jhaveri
(74) *Attorney, Agent, or Firm* — Moser Taboada

(57) ABSTRACT

Systems and methods for malware filtering are provided herein. In some embodiments, a system having one or more processors is configured to: retrieve a file downloaded to a user device; break the downloaded file into a plurality of chunks; scan the plurality of chunks to identify potentially malicious chunks; predict whether the downloaded file is malicious based on the scan of the plurality of chunks; and determine whether the downloaded file is malicious based on the prediction.

17 Claims, 4 Drawing Sheets

SYSTEM AND METHOD FOR DIFFERENTIAL MALWARE SCANNER

FIELD

This disclosure relates generally to computer security, and more particularly to identifying security issues in Internet downloaded files.

BACKGROUND

The traditional line of defense against malware is composed of malware detectors such as virus and spyware scanners. Static analysis is a process of analyzing a malware binary without actually running the code. Static analysis is generally performed by determining the signature of the binary file which is a unique identification for the binary file and can be done by calculating the cryptographic hash of the file and understanding each component.

Conventional static analysis tools often analyze certain portions of a binary file, such as a fixed number of bytes of the beginning, the middle, and the end of the binary file. This feature can be exploited by hackers who can choose to strategically insert malicious code into binary files at locations known to not be analyzed by conventional static analysis tools.

SUMMARY

Systems and methods for recent file malware scanning are provided herein. In some embodiments, a system includes a processor programmed to retrieve a file downloaded to a user device; break or separate the downloaded file into a plurality of chunks or sections; use information gain to select some of the chunks; scan the selected chunks to identify potentially malicious chunks; predict whether the downloaded file is malicious based on the scan of the selected chunks; and determine whether the downloaded file is malicious based on the prediction.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
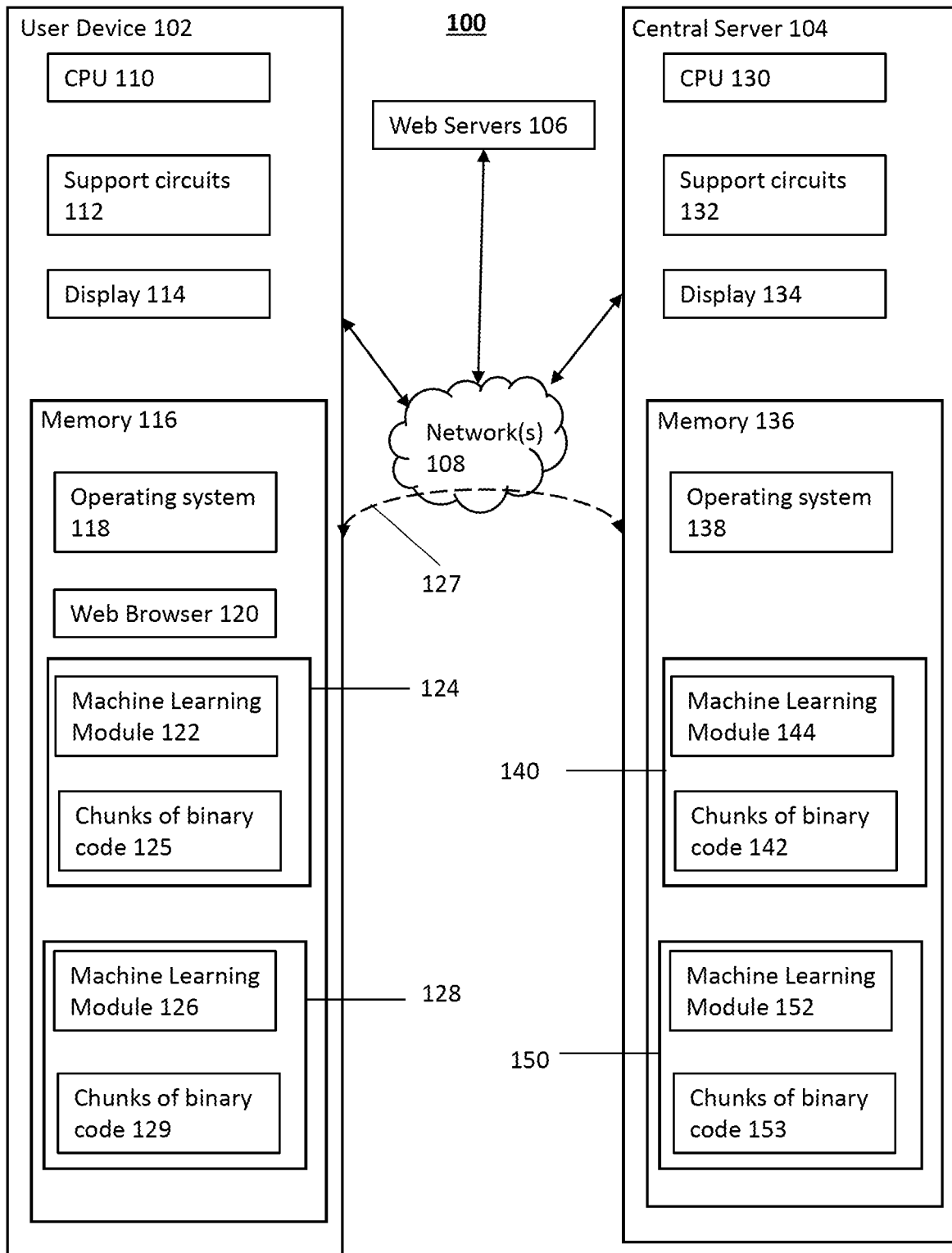
FIG. 1 depicts a high-level block diagram of a network architecture of a system for malware scanning in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for efficiently scanning files downloaded from the Internet. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the disclosure use a solution that works with downloaded files (code) from the Internet, which can include malicious content. Malicious files may include content (i.e., code) that a user would deem unimportant and/or would cause harm to their user device (e.g., malware, viruses, etc.).

A system in accordance with this disclosure can perform a static analysis of a file by breaking up or separating the file (code) into discrete chunks of code and analyzing the chunks of the file or code to identify whether the file contains any hidden malware. Breaking up the file or code may include separating sections of the file or code into discrete chunks to be analyzed. By performing the analysis on chunks, the system is able to efficiently identify features or signatures of the chunks that are indicative of malicious code, which may have been added by hackers/bad actors. In some embodiments, a system in accordance with this disclosure can perform a behavior (dynamic) analysis of a downloaded file by running the downloaded file on an isolated virtual machine (otherwise known as a "protected sandbox") to correlate or map each chunk with an observed behavior of the code on the virtual machine during execution of the file. In this way, certain chunks can be classified based on the anticipated behavior, which may be malicious. The behaviors may match known behaviors that are known to be part of malicious files. Thus, it may be determined that downloaded files having chunks of data corresponding to classified behaviors are malicious.

In embodiments, an application on a user device may break a downloaded file (i.e., an executable/binary file downloaded from the Internet) into chunks. The application may also use a machine learning algorithm on the chunks to determine whether the chunks, and therefore the downloaded file, contains malicious content. Chunks and files identified as malicious may be sent to a centralized server to update the machine learning algorithm (model), which can be distributed to other user devices. Alternatively, the aforementioned application may run on the centralized server which can update its own machine learning algorithm (model) and distribute that algorithm (model) to one or more user devices. In this manner, the search and identification of undesirable files is distributed and democratized across a user base.

Thus, systems, apparatuses, and methods consistent with embodiments of this present disclosure detect malicious files using machine learning. Such detected malicious files may be handled according to various rules, e.g., allow the execution of the file, block the execution of the file, report the file as malicious, allow the execution of the file only upon user authorization, etc. Details of such systems, apparatuses and methods are described in detail below with respect to the figures.

FIG. 1 depicts a block diagram of a Differential Malware Scanning and Filtering system 100 in accordance with at least one embodiment of the disclosure. The system 100 includes one or more user devices 102, a centralized server 104, and web servers 106 communicatively coupled via one or more networks 108.

The networks 108 comprise one or more communication systems that connect computers by wire, cable, fiber optic and/or wireless link facilitated by various types of well-known network elements, such as hubs, switches, routers, and the like. The networks 106 may include an Internet Protocol (IP) network, a public switched telephone network (PSTN), or other mobile communication networks, and may employ various well-known protocols to communicate information amongst the network resources.

The end-user device (also referred throughout as "user device") 102 comprises a Central Processing Unit (CPU) 110, support circuits 112, display device 114, and memory 116. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The memory 116 comprises at least one of Read Only Memory (ROM), Random Access Memory (RAM), disk drive storage, optical storage, removable storage and/or the like. In some embodiments, the memory 116 comprises an operating system 118, web browser 120, a file verification module 124 having a machine learning module 122, and a behavior analysis module 128 having a machine learning module 126.

The operating system (OS) 118 generally manages various computer resources (e.g., network resources, file processors, and/or the like). The operating system 118 is configured to execute operations on one or more hardware and/or software modules, such as Network Interface Cards (NICs), hard disks, virtualization layers, firewalls and/or the like. Examples of the operating system 118 may include, but are not limited to, various versions of LINUX, MAC OSX, BSD, UNIX, MICROSOFT WINDOWS, IOS, ANDROID and the like.

The web browser 120 is a well know application for accessing and displaying web page content. Such browsers include, but are not limited to, Safari®, Chrome®, Explorer®, Firefox®, etc. The machine learning modules 122 and 126 may be applications that may be run by the web browser 120 or the operating system 118.

In some embodiments, the file verification module 124 and/or the behavior analysis module 128 is a security/antimalware service that runs on the user device 102 in the background. In embodiments, for every file downloaded by the web browser 120 or the operating system 118, the file verification module 124 on the user device 102 may check whether the file is malicious. If the file is malicious, the user device 102 may take actions according to various rules, e.g., allow the execution of the file, block the execution of the file, report the file as malicious, allow the execution of the file only upon user authorization, etc. In some embodiments, the file verification module 124 may also forward the file to the centralized server 104 to determine whether the file is malicious (e.g., via networks 108). This may be done, for example, as a secondary or supplemental check if the file verification module 124 determines that the file is not malicious. If the centralized server 104 determines the file is not malicious, the file verification module 124 may report the file as not being malicious. However, if the centralized server 104 determines the file is malicious, the file verification module 124 may take action according to various rules, e.g., allow the execution of the file, block the execution of the file, report the file as malicious, allow the execution of the file only upon user authorization, isolate or quarantine the file, etc. In embodiments, if the downloaded file is determined to be malicious, the file verification module 124 or the web browser 120 may generate a notification (e.g., a warning message) to display on the user device 102 to inform a user that the downloaded file is malicious as well as possible harmful actions that may be caused by running the file on the user device 102. In some embodiments, any denial of access to the file may be overridden by a user selection through interaction with the web browser 120 or other interface displayed by the file verification module 124 (i.e., by entering an override command into the web browser 120 or the file verification module 124).

In some embodiments, the file verification module 124 may store files determined by the centralized server 104 to be malicious, and/or chunks of binary code from those malicious files to a database, file, or other storage structure accessible to the user device 102.

The user device 102 may also include the behavior (dynamic) analysis module 128 configured to perform a behavior (dynamic) analysis on a downloaded executable file. For example, the behavior analysis module 128 may execute the downloaded executable file in a protected sandbox or virtual machine on the user device 102 to trace the execution of the downloaded executable file. As the code is being executed, the behavior analysis module 128 can correlate or map the actions or behaviors taking place in the protected sandbox or virtual machine to a corresponding file being executed. In embodiments, where a static analysis is also performed, the behavior analysis module 128 can correlate or map the actions or behaviors taking place in the protected sandbox or virtual machine to a corresponding chunk being executed. The behavior analysis module 128 may use the machine learning module 126 to classify or otherwise label the downloaded executable files according to their corresponding behavior. The machine learning module 126 may include a machine learning model that may be applied to the downloaded executable files to predict whether the downloaded file is malicious. Based on the prediction, which may be expressed as a probability or likelihood that the downloaded file is malicious, a determination can be made by the behavior analysis module 128 about whether the downloaded file is malicious. If the behavior analysis module 128 determines the file is malicious, the behavior analysis module 128 may take action according to various rules, e.g., allow the execution of the file, block the execution of the file, report the file as malicious, allow the execution of the file only upon user authorization, etc.

The centralized server 104 comprises a Central Processing Unit (CPU) 130, support circuits 132, display device 134, and memory 136. The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 comprises at least one of Read Only Memory (ROM), Random Access Memory (RAM), disk drive storage, optical storage, removable storage and/or the like. In some embodiments, the memory 136 comprises an operating system 138, a file verification module 140, and a behavior analysis module 150. The file verification module 140 may include chunks of binary code 142 in the form of a database, file, or other storage structure, and a machine learning module 144. The file verification module 140 may have a machine learning module 144, and the behavior analysis module 150 may have a machine learning module 152. The file verification module 140 and the machine learning module 144 may have the same functionality as the file verification module 124 and machine learning module 122, respectively. Also, the behavior analysis module 128 and the machine learning module 126 may have the same functionality as the behavior analysis module 150 and the machine learning module 152.

In embodiments, the centralized server 104 is configured to send a response 127 (e.g., a malicious file determination) to the user device 102 via networks 108. Based on the response, the user device 102 may take various actions discussed above.

In operation, in some embodiments as described above, when a user device 102 downloads a file from the Internet, the transparent file verification module 124 running on the user device 102 may perform a file verification process on the user device 102 and/or may send a request 127 to the central server 104 for the file verification processing to determine if the file is malicious. The downloaded file may be sent from the user device 102 to the central server 104 with the request. The file verification module 140 may process the file sent with the verification request by predicting whether or not the file is malicious based on machine learning algorithms and trained models it has created/stored based on previous analysis and verification of known malicious files.

The file verification module 140 of the centralized server 104 may analyze the downloaded file in chunks. The centralized server 104 may employ the machine learning module 144 to calculate information gain for each chunk. As used herein, information gain is a measure of the reduction in entropy or surprise from transforming a dataset in some way. It is commonly used in machine learning in the construction of decision trees from a training dataset, by evaluating the information gain for each variable, and selecting the variable that maximizes the information gain, which in turn minimizes the entropy and best splits the dataset into groups for effective classification. Information gain can also be used for feature selection, by evaluating the gain of each variable in the context of the target variable. In this slightly different usage, the calculation is referred to as mutual information between the two random variables. As used herein, information gain related to the analysis of each chunk refers to the predefined algorithm (e.g. C4.5, C5.0/See5, ID.3) of code chunks evaluation. When applied, the algorithm provides most information about maliciousness or cleanliness of the downloaded file. Having that information, the most informative code chunks are selected as machine learning features, and then used in the preprocessing stage. Also, the file verification module 140 may employ the machine learning module 144 to score the chunks based on their information gain (e.g., rank of the number of occurrences of the chunk in the downloaded file). From the scores assigned to the chunks, the machine learning module 144 may use a machine learning model to predict whether the file associated with the chunks is malicious. The prediction may be expressed as a probability of the downloaded file being malicious.

A prediction threshold probability may be used to make a final determination of the maliciousness of the downloaded file based on the predicted probability of the maliciousness of the downloaded file. For example, if the predicted probability that the downloaded file is malicious is greater than a predetermined threshold probability, the machine learning module 144 may determine that the file is malicious. Otherwise, if the calculated probability is at or below the predetermined threshold probability, the machine learning module 144 may determine that the file is not malicious. The predicted probability of maliciousness can be determined via two or more thresholds (e.g., low, medium, high probability). With a score of 0-25% a file could be named as "non-malicious", with a score of 26-75% a file could be named as "potentially malicious", and with a score of 76-100% a file could be named as "malicious". The threshold may be adjusted by a service provider.

If the downloaded file is determined to be malicious, the centralized server 104 may generate and send the response 127 to the file verification module 124 of the user device 102. The response 127 may include a notification that the downloaded file is malicious. The centralized server 104 may also be configured to update the machine learning model used by the machine learning module 144 to include the predicted malicious file and the code chunks derived therefrom, which may be stored in the memory 136 or in another storage module. Thus, the system 100 is configured to dynamically update the machine learning module 144 and learn from the predictions. The machine learning module 144 may distribute the updated machine learning module to other user devices 102 to update their respective machine learning modules 122.

In some embodiments as described above, when a user device 102 downloads an executable file from the Internet, the transparent behavior analysis module 128 running on the user device 102 may perform a behavior (dynamic) analysis process on the user device 102 and/or may send a request 127 to the central server 104 for the behavior analysis processing to determine if the file is malicious. The downloaded executable file may be sent from the user device 102 to the central server 104 with the request. The central server 104 may include a behavior analysis module 150 that may process the behavior analysis request using the downloaded executable file by predicting whether the file is malicious based on machine learning algorithms and trained models it has created/stored based on previous behavior analysis of known malicious files.

The behavior analysis module 150 of the centralized server 104 may analyze the behavior of a downloaded executable file in an isolated sandbox. The behavior analysis module 150 may employ the machine learning module 152 to run the downloaded file in a virtual machine or protected sandbox to observe behaviors occurring during execution of the file. As the file/code is executed, or as parts of the file/code are executed, the machine learning module 152 may correlate behaviors occurring in the virtual machine to the corresponding chunks/parts of code/file being run. In instances where a static analysis of the downloaded executable file is also performed (according to embodiments discussed herein), the machine learning module 152 may also classify the chunks based on their observed behavior. That is, in embodiments, where a static analysis is also performed on a downloaded executable file, the behavior analysis module 150 may correlate or map the actions or behaviors taking place in the protected sandbox or virtual machine to a corresponding chunk being executed. Based on the classification of the chunks, the machine learning module 152 may score the chunks as more or less likely to be associated with a malicious file. From the scores assigned to the chunks, the machine learning module 152 may use a machine learning model to predict whether the file associated with the chunks is malicious. The prediction may be expressed as a probability of the downloaded file being malicious.

A prediction threshold probability may be used to make a final determination of the maliciousness of the downloaded file based on the predicted probability of the maliciousness of the downloaded file. For example, if the predicted probability that the downloaded file is malicious is greater than a predetermined threshold probability, the machine learning module 152 may determine that the file is malicious. Otherwise, if the calculated probability is at or below the predetermined threshold probability, the machine learning module 152 may determine that the file is not malicious.

If the downloaded file is determined to be malicious, the centralized server 104 may generate and send the response 127 to the behavior analysis module 128 of the user device 102. The response 127 may include a notification that the downloaded file is malicious. The centralized server 104 may also be configured to update the machine learning model used by the machine learning module 152 to include the predicted malicious file and the code chunks derived therefrom, which may be stored in the memory 136 or other storage module. Thus, the system 100 is configured to dynamically update the file verification module 152 and learn from the predictions. The machine learning module 152 may distribute the updated machine learning module to other user devices 102 to update their respective machine learning modules 126.

In some embodiments, the machine learning model or algorithms used by machine learning modules 122, 126, 144, and 152 may include a multi-layer neural network comprising nodes that are trained to have specific weights and biases. In some embodiments, the machine learning algorithm employs artificial intelligence techniques or machine learning techniques to determine malicious chunks of binary code. In some embodiments, in accordance with the present principles, suitable machine learning techniques can be applied to learn commonalities in malicious code chunks and for determining from the machine learning techniques at what level malicious code chunks can be canonicalized. In some embodiments, machine learning techniques that can be applied to learn commonalities in malicious code chunks can include, but are not limited to, regression methods, ensemble methods, or neural networks and deep learning such as 'Se2oSeq' Recurrent Neural Network (RNNs)/Long Short Term Memory (LSTM) networks, Convolution Neural Networks (CNNs), Encoders and/or Decoders (including Transformers), graph neural networks applied to the abstract syntax trees corresponding to the malicious URLs, and the like.

In some embodiments, the scores attributed to chunks of code are derived from an analysis of known malicious files. For example, the machine learning module 144 may train the machine learning model of the machine learning module 144 to derive scoring rules based on training data (e.g., binary code chunks) derived from known malicious files. Thus, the machine learning module 144 can employ known malicious files to train the machine learning model to generate the scoring rules.

For example, in embodiments, to train the machine learning model of the machine learning module 144, the central server 104 may retrieve executable files from a storage of known malicious files, and break apart the binary code of the executable file into chunks, such as 5 or 8 bytes in size. The central server 104 may inspect the chunks to identify features or signatures that can be used to classify or score the chunks according to possible maliciousness of the chunk. For example, in embodiments, the central server 104 may calculate information gain for each of the chunks, which can then be scored based on the information gain. Once the machine learning model of the machine learning module 144 is trained, the central server 104 can deploy the machine learning model on one or more user devices 102 as the machine learning model of the machine learning modules 122.

In some embodiments, the file verification module 124 and/or the file verification module 140 decompiles the entire downloaded file and scores all of the chunks of binary code corresponding to the downloaded file. In some embodiments, however, less than all of the chunks may be scored. For example, in some embodiments, only chunks exceeding a threshold information gain are scored and used in predicting whether the downloaded file is malicious. This may reduce the speed of file verification.

Also, in some embodiments, the behavior analysis module 150 may have a machine learning module 152 that trains a machine learning model based on training data (e.g., chunks of binary code) derived from known malicious files that have been executed in a virtual machine or protected sandbox. For example, in embodiments, to train the machine learning model of the machine learning module 152, the central server 104 may retrieve executable files from a storage of known malicious files, decompile the known malicious executable files into binary code, and break apart the binary code into chunks, such as 5 or 8 bytes in size. The central server 104 may execute the downloaded file in the virtual machine or protected sandbox to observe the behavior of the virtual machine during execution of the file. Known malicious behaviors are correlated or mapped to the corresponding chunk(s) or parts of the code being executed. The chunks and their behaviors can then be stored in a data storage and used for comparison by the machine learning model for analyzing chunks of code of unknown downloaded files. Once the machine learning model of the machine learning module 152 is trained, the central server 104 can deploy the machine learning module on one or more user devices 102 as the machine learning model of the machine learning module 126 of the behavior analysis module 128.

Figure 2:
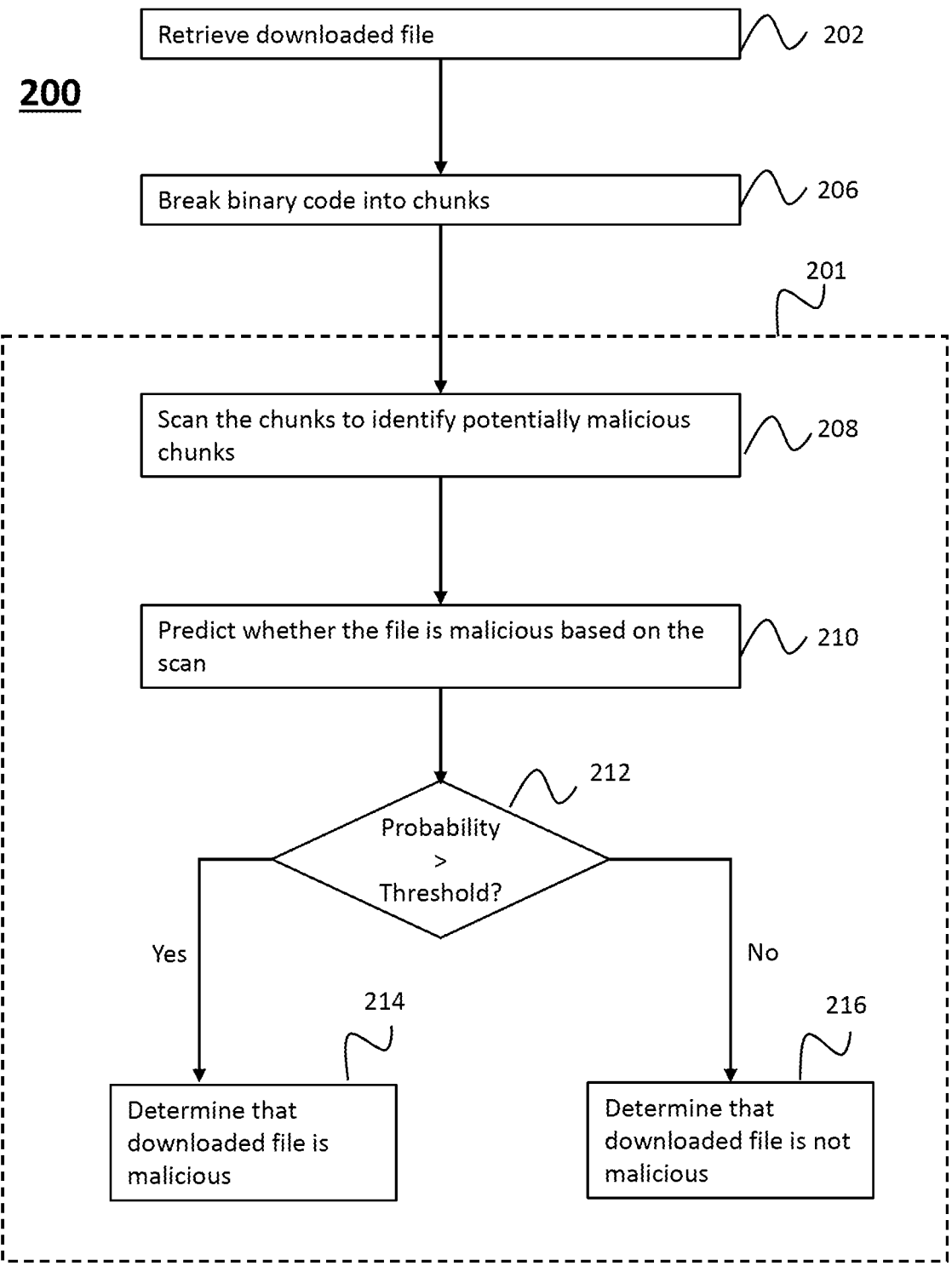
FIG. 2 depicts a flow diagram of a method for malware scanning, in accordance with an embodiment of the present principles.
Figure 3:
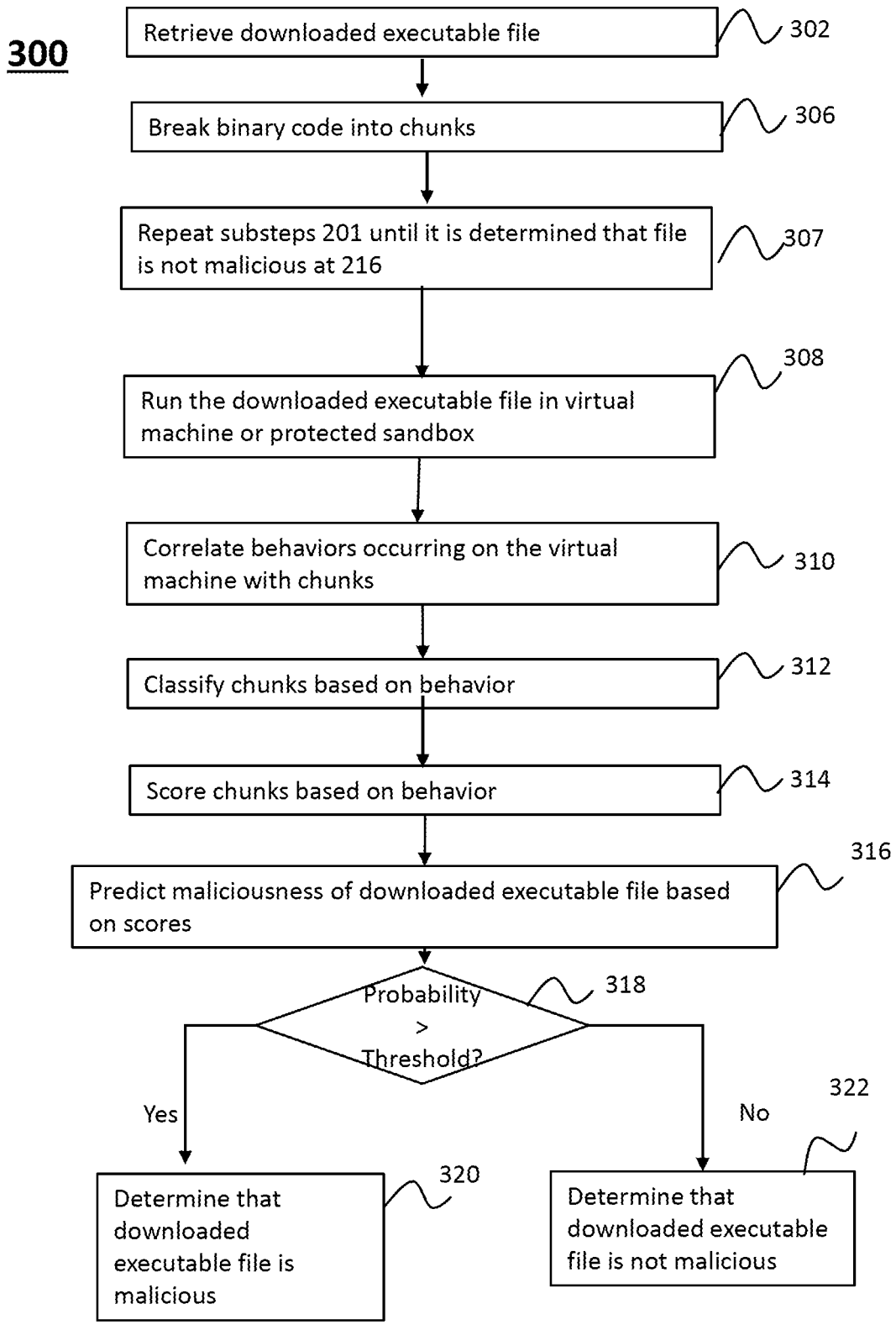
FIG. 3 depicts a flow diagram of a method for malware scanning, in accordance with an embodiment of the present principles.

FIGS. 2 and 3 illustrate example flow diagrams representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is an example process 200 a flow diagram of a method for efficient malware scanning, in accordance with an embodiment of the present principles. Such a process 200 may begin at step 202 by retrieving a downloaded file. Such a file may have been downloaded from the Internet by the user device 102. Such a downloaded file may be sent by the file verification module 124 to the central server 104 for malware scanning. At step 206, the binary code is broken up into chunks. At step 208, the chunks are scanned to identify potentially malicious chunks. For example, in embodiments, at step 208, the information gain is calculated for each chunk and a machine learning model is applied to the chunks to score the chunks based on the information gain. The scores attributed to the chunks relate to the maliciousness of the chunk based on the machine learning model. For example, the machine learning model may be trained using known malicious files and known non-malicious files, as described hereinabove. The known malicious files have been decompiled and broken up into chunks which have been analyzed for features or signatures indicative of being more likely to be malicious than other chunks. Thus, when the machine model is applied to the chunks, the model is able to identify which chunks are more likely to be malicious than others.

At step 210, based on the scoring applied to the chunks in step 208, a prediction is made about whether the downloaded file is malicious. The prediction may be made by the machine learning model, which may calculate a probability that the downloaded file is malicious based on the scoring of the chunks. A probability threshold may be used to determine whether a downloaded file is malicious based on the prediction. For example, a rule may be established that a file would be determined to be malicious if the predicted probability of maliciousness exceeds the probability threshold (e.g., 50%) and would be determined to be non-malicious if the predicted probability was at or below the threshold. In another example, the predicted probability of maliciousness can be determined via two or more thresholds (e.g. low, medium, high probability). With score 0-25% a file may be named as "non-malicious", with a score of 26-75% a file may be named as "potentially malicious", and with a score of 76-100% a file may be named "malicious". The threshold may be adjusted by a service provider. Thus, at step 212 a determination is made about whether the predicted probability of maliciousness is greater than the threshold. If the probability is greater than the threshold, then the downloaded file is determined to be malicious at step 214. Otherwise, if the probability is less than or equal to the threshold, the downloaded file is determined to be non-malicious. The method 200 may end at steps 214 or 216 or may continue with the system 100 taking one of the above-mentioned actions according to various rules, e.g., allow the execution of the file, block the execution of the file, report the file as malicious, allow the execution of the file only upon user authorization, etc.

FIG. 3 illustrates an example flow diagram representing a behavioral analysis method in accordance with the disclosure. The method 300 begins at step 302 by retrieving a downloaded executable file. At step 306, the binary file is broken into chunks. At step 307, substeps 201 of workflow 200 are performed until it is determined at step 216 that the downloaded executable file is not malicious. At step 308, the downloaded file is run in a virtual machine or protected sandbox to trace the execution of the file. At step 310, the behavior of the virtual machine or protected sandbox is correlated or mapped to the corresponding chunks as the file is running. At step 312, each chunk is classified or otherwise labeled based on the corresponding behavior observed. In this way, any chunks exhibiting behaviors that are known to be associated with malicious files will be used to score the chunks as more likely to be malicious at step 314. At step 316, a prediction of maliciousness of the downloaded executable file may be made based on the score of the chunks. Such a prediction may be performed by a machine learning model trained on known malicious files that have been run on virtual machines and whose binary code has been broken into chunks and analyzed for behaviors. At step 318, a determination is made about whether the downloaded executable file is malicious based on the prediction at step 316. The determination may be based on a probability threshold like that in step 212 of method 200. Thus, if the predicted probability of maliciousness of the downloaded executable file is above a threshold, then it is determined at step 320 that the downloaded executable file is malicious, while if the predicted probability is at or below the threshold, then it is determined at step 322 that the file is non-malicious. The method 300 may end at steps 320 or 322 or may continue with the system 100 taking one of the above-mentioned actions according to various rules, e.g., allow the execution of the file, block the execution of the file, report the file as malicious, allow the execution of the file only upon user authorization, etc. Also, if the downloaded file is determined to be malicious, the system 100 may use the web browser 120 or other application on the user device 102 to notify a user of the consequences of running the downloaded file in terms of the type of behaviors that may occur to the user device 102.

Figure 4:
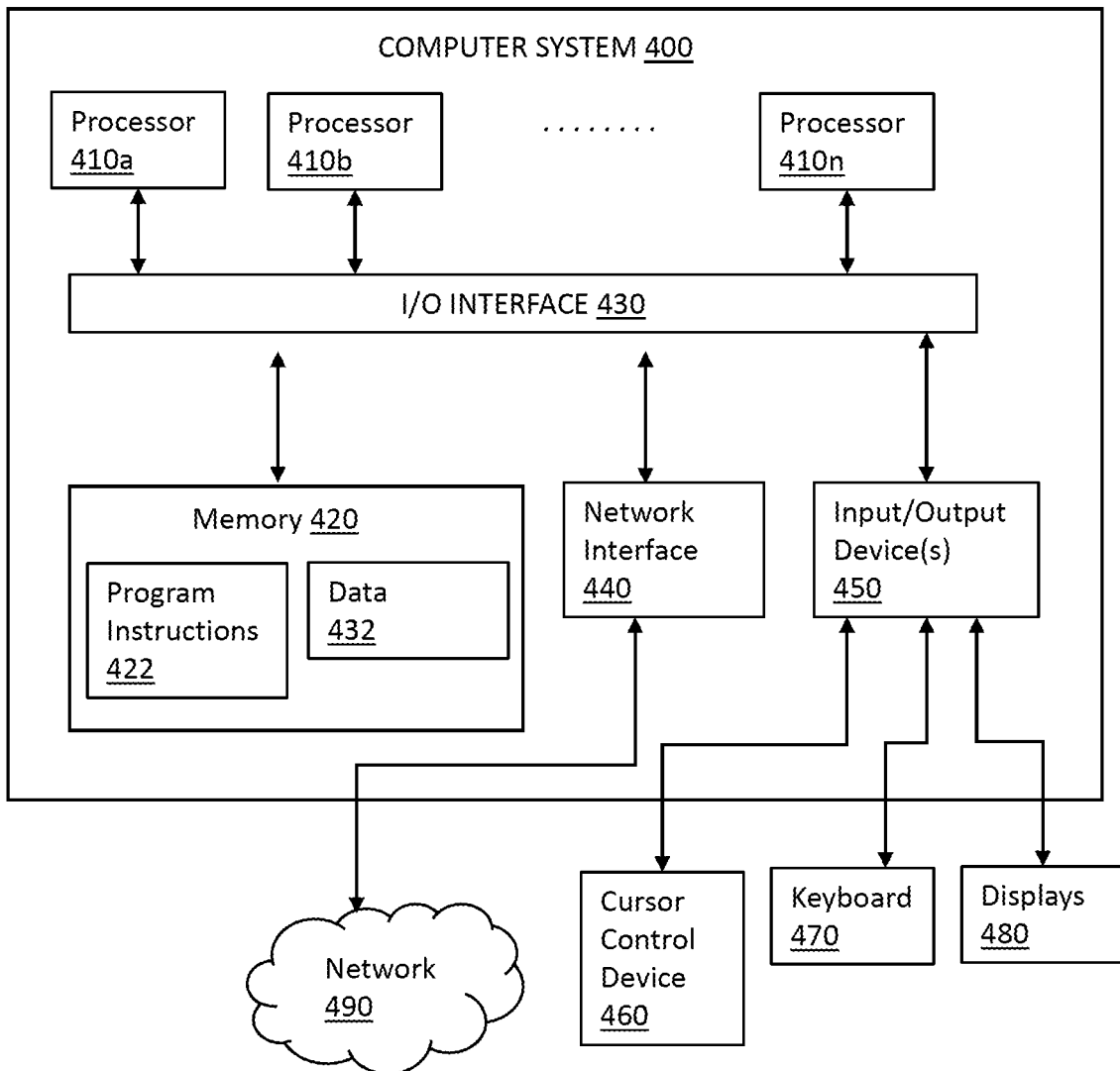
FIG. 4 depicts a high-level block diagram of a computing device suitable for use with embodiments for efficient malware scanning of downloaded file in accordance with the present principles.

FIG. 4 depicts a computer system 400 that can be utilized in various embodiments of the invention to implement the computer and/or the display, according to one or more embodiments.

Various embodiments of method and system for recent file scanning, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the methods 200 and 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the methods illustrated by the flowchart of FIGS. 2 and 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

EXAMPLE CLAUSES

A. A malware filtering system having one or more processors configured to:
   retrieve a file downloaded to a user device;
   break the file into a plurality of chunks;
   scan the plurality of chunks to identify potentially malicious chunks;
   predict whether the executable file is malicious based on the scan of the plurality of chunks; and
   determine whether the executable file is malicious based on the prediction.
B. The system according to clause A, wherein the processor is programmed to scan the plurality of chunks by calculating an information gain of each chunk and scoring each chunk based on an information gain of each chunk.
C. The system according to clauses A or B, wherein the processor is configured to predict whether the downloaded file is malicious based on the scores of each of the chunks.
D. The system according to clauses A-C, wherein the processor is configured to score each of the chunks and predict whether the downloaded file is malicious by applying a machine learning model to the plurality of chunks.
E. The system according to clauses A-D, wherein the processor is further configured to update the machine learning model and distribute the updated machine learning model to the user device and other user devices.
F. The system according to clauses A-E, wherein the processor is further programmed to execute the downloaded file;
   associate behaviors occurring during execution of the downloaded file with each chunk; predict whether the downloaded file is malicious based on the behaviors associated with each chunk; and
   determine whether the downloaded file is malicious based on the prediction.
G. A malware filtering method comprising:
   retrieving a file downloaded to a user device;
   breaking the downloaded file into a plurality of chunks;
   scanning the plurality of chunks to identify potentially malicious chunks;
   predicting whether the downloaded file is malicious based on the scanning of the plurality of chunks; and
   determining whether the downloaded file is malicious based on the predicting.
H. The method according to clause G, wherein scanning the plurality of chunks includes calculating an information gain of each chunk and scoring each chunk based on the information gain of each chunk.
I. The method according to clauses G or H, wherein predicting whether the downloaded file is malicious is based on the score of each chunk.

J. The method according to clauses G-I, wherein scoring each chunk and predicting whether the downloaded file is malicious includes applying a machine learning model to the plurality of chunks.

K. The method according to clauses G-J, further comprising updating the machine learning model and distributing the updated machine learning model to a user device.

L. The method according to clauses G-K, wherein determining whether the downloaded file is malicious includes comparing a predicted probability that the downloaded file is malicious against a predetermined threshold probability, wherein the downloaded file is determined to be malicious if the predicted probability exceeds the predetermined threshold and is determined to be not malicious if the predicted probability is at or below the predetermined threshold.

M. The method according to clauses G-L, further comprising:
  executing the downloaded file;
  associating behaviors occurring during execution of the downloaded file with each chunk;
  predicting whether the downloaded file is malicious based on the behaviors associated with each chunk; and
  determining whether the downloaded file is malicious based on the prediction.

N. A non-transitory computer-readable medium storing a computer program, which, when read and executed by a computer causes the computer to perform a malware filtering method comprising:
  retrieving a file downloaded to a user device;
  breaking the downloaded file into a plurality of chunks;
  scanning the plurality of chunks to identify potentially malicious chunks;
  predicting whether the downloaded file is malicious based on the scanning of the plurality of chunks; and
  determining whether the downloaded file is malicious based on the predicting.

O. The non-transitory computer-readable medium according to clause N, wherein scanning the plurality of chunks includes calculating an information gain of each chunk and scoring each chunk based on the information gain of each chunk.

P. The non-transitory computer-readable medium according to clauses N or O, wherein predicting whether the downloaded file is malicious is based on the score of each chunk.

Q. The non-transitory computer-readable medium according to clauses N-P, wherein scoring each chunk and predicting whether the downloaded file is malicious includes applying a machine learning model to the plurality of chunks.

R. The non-transitory computer-readable medium according to clauses N-Q, wherein the method further comprises updating the machine learning model and distributing the updated machine learning model to a user device.

S. The non-transitory computer-readable medium according to clauses N-R, wherein determining whether the downloaded file is malicious includes comparing a predicted probability that the downloaded file is malicious against a predetermined threshold probability, wherein the executable file is determined to be malicious if the predicted probability exceeds the predetermined threshold and is determined to be not malicious if the predicted probability is at or below the predetermined threshold.

T. The non-transitory computer-readable medium according to clauses N-T, wherein the malware filtering method further comprises:
  executing the downloaded file;
  associating behaviors occurring during execution of the downloaded file with each chunk;
  predicting whether the downloaded file is malicious based on the behaviors associated with each chunk; and
  determining whether the downloaded file is malicious based on the prediction.

What is claimed is:

1. A malware filtering system having one or more processors configured to:
  retrieve a file downloaded to a user device;
  break the downloaded file into a plurality of chunks;
  scan the plurality of chunks to identify potentially malicious chunks;
  predict whether the downloaded file is malicious based on the scan of the plurality of chunks;
  determine whether the downloaded file is malicious based on the prediction based on the scan of the plurality of chunks;
  if it is determined that the downloaded file is not malicious based on the prediction based on the scan of the plurality of chunks, execute the downloaded file;
  associate behaviors occurring during said execution of the downloaded file with each of the plurality of chunks;
  predict whether the downloaded file is malicious based on the behaviors associated with each of the plurality of chunks; and
  determine whether the downloaded file is malicious based on the prediction based on the behaviors.

2. The system according to claim 1, wherein the processor is programmed to scan the plurality of chunks by calculating an information gain of each of the plurality of chunks and scoring each of the plurality of chunks based on the information gain of each of the plurality of chunks.

3. The system according to claim 2, wherein the processor is configured to predict whether the downloaded file is malicious based on the scores of each of the plurality of chunks.

4. The system according to claim 3, wherein the processor is configured to score each of the plurality of chunks and predict whether the downloaded file is malicious by applying a machine learning model to the plurality of chunks.

5. The system according to claim 4, wherein the processor is further configured to update the machine learning model and distribute the updated machine learning model to the user device and other user devices.

6. A malware filtering method comprising:
  retrieving a file downloaded to a user device;
  breaking the downloaded file into a plurality of chunks;
  scanning the plurality of chunks to identify potentially malicious chunks;
  predicting whether the downloaded file is malicious based on the scanning of the plurality of chunks;
  determining whether the downloaded file is malicious based on the predicting based on the scanning of the plurality of chunks;
  if it is determined that the downloaded file is not malicious based on the predicting based on the scanning of the plurality of chunks, executing the downloaded file;
  associating behaviors occurring during said execution of the downloaded file with each of the plurality of chunks;
  predicting whether the downloaded file is malicious based on the behaviors associated with each of the plurality of chunks; and
  determining whether the downloaded file is malicious based on the prediction based on the behaviors.

7. The method according to claim 6, wherein scanning the plurality of chunks includes calculating an information gain of each of the plurality of chunks and scoring each of the plurality of chunks based on the information gain of each of the plurality of chunks.

8. The method according to claim 7, wherein predicting whether the downloaded file is malicious is based on the score of each of the plurality of chunks.

9. The method according to claim 7, wherein scoring each of the plurality of chunks and predicting whether the downloaded file is malicious includes applying a machine learning model to the plurality of chunks.

10. The method according to claim 9, further comprising updating the machine learning model and distributing the updated machine learning model to a user device.

11. The method according to claim 6, wherein determining whether the downloaded file is malicious includes comparing a predicted probability that the downloaded file is malicious against a predetermined threshold probability, wherein the downloaded file is determined to be malicious if the predicted probability exceeds the predetermined threshold and is determined to be not malicious if the predicted probability is at or below the predetermined threshold.

12. A non-transitory computer-readable medium storing a computer program, which, when read and executed by a computer causes the computer to perform a malware filtering method comprising:
   retrieving a file downloaded to a user device;
   breaking the downloaded file into a plurality of chunks;
   scanning the plurality of chunks to identify potentially malicious chunks;
   predicting whether the downloaded file is malicious based on the scanning of the plurality of chunks;
   determining whether the downloaded file is malicious based on the predicting based on the scanning of the plurality of chunks;
   if it is determined that the downloaded file is not malicious based on the predicting based on the scanning of the plurality of chunks, executing the downloaded file;
   associating behaviors occurring during said execution of the downloaded file with each chunk of the plurality of chunks;
   predicting whether the downloaded file is malicious based on the behaviors associated with each of the plurality of chunks; and
   determining whether the downloaded file is malicious based on the prediction based on the behaviors.

13. The non-transitory computer-readable medium according to claim 12, wherein scanning the plurality of chunks includes calculating an information gain of each of the plurality of chunks and scoring each of the plurality of chunks based on the information gain of each of the plurality of chunks.

14. The non-transitory computer-readable medium according to claim 13, wherein predicting whether the downloaded file is malicious is based on the score of each of the plurality of chunks.

15. The non-transitory computer-readable medium according to claim 13, wherein scoring each of the plurality of chunks and predicting whether the downloaded file is malicious includes applying a machine learning model to the plurality of chunks.

16. The non-transitory computer-readable medium according to claim 15, wherein the method further comprises updating the machine learning model and distributing the updated machine learning model to a user device.

17. The non-transitory computer-readable medium according to claim 12, wherein determining whether the downloaded file is malicious includes comparing a predicted probability that the downloaded file is malicious against a predetermined threshold probability, wherein the downloaded file is determined to be malicious if the predicted probability exceeds the predetermined threshold and is determined to be not malicious if the predicted probability is at or below the predetermined threshold.

* * * * *